United States Patent
Mohandes et al.

(10) Patent No.: US 12,417,639 B1
(45) Date of Patent: Sep. 16, 2025

(54) METHOD AND SYSTEM FOR CROWD MANAGEMENT IN RELIGIOUS SITES

(71) Applicant: KING FAHD UNIVERSITY OF PETROLEUM AND MINERALS, Dhahran (SA)

(72) Inventors: Mohamed Mohandes, Dhahran (SA); Ali Al-Shaikhi, Dhahran (SA); Bo Liu, Dhahran (SA); Shafiqur Rehman, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 19/021,009

(22) Filed: Jan. 14, 2025

(51) Int. Cl.
| | |
|---|---|
| *G06V 20/52* | (2022.01) |
| *G06V 10/26* | (2022.01) |
| *G06V 10/77* | (2022.01) |
| *G06V 10/776* | (2022.01) |
| *G06V 10/82* | (2022.01) |
| *H04M 1/72436* | (2021.01) |

(Continued)

(52) U.S. Cl.
CPC ............ *G06V 20/53* (2022.01); *G06V 10/273* (2022.01); *G06V 10/7715* (2022.01); *G06V 10/776* (2022.01); *G06V 10/82* (2022.01); *H04M 1/72436* (2021.01); *H04N 7/181* (2013.01); *G06V 10/40* (2022.01); *H04W 4/024* (2018.02); *H04W 4/12* (2013.01)

(58) Field of Classification Search
None
See application file for complete search history.

(56) References Cited

U.S. PATENT DOCUMENTS

| | | | |
|---|---|---|---|
| 12,254,641 B2 * | 3/2025 | Jia | G06V 20/53 |
| 2019/0208365 A1 | 7/2019 | Benrachi et al. | |

(Continued)

FOREIGN PATENT DOCUMENTS

| | | | |
|---|---|---|---|
| CN | 110543867 B | 10/2021 | |
| EP | 4 033 399 A1 | 7/2022 | |
| WO | WO-2024085023 A1 * | 4/2024 | G06V 20/53 |

OTHER PUBLICATIONS

Shalash et al., A Mobile Based Crowd Management System, Jun. 6, 2017, International Journal of Advanced Research in Computer and Communication Engineering, vol. 6, pp. 205-215. (Year: 2017).*

(Continued)

*Primary Examiner* — James M Anderson, II
(74) *Attorney, Agent, or Firm* — Oblon, McClelland, Maier & Neustadt, L.L.P.

(57) ABSTRACT

A method and a system for performing crowd management in a religious site includes receiving registration information from a plurality of pilgrims, including mobile numbers for receiving text messages. The method includes periodically capturing, by a plurality of surveillance cameras, camera view images for views of each camera of respective portions of the religious site. The method includes automatically estimating a number of pilgrims in each camera view image using an Artificial Intelligence (AI) algorithm. The method includes automatically detecting a percentage of mobile numbers of pilgrims occupying overcrowded areas and sending text messages to the detected percentage of mobile numbers that direct the pilgrims to different areas where the camera view images have low crowd density.

10 Claims, 15 Drawing Sheets

(51) Int. Cl.
  *H04N 7/18* (2006.01)
  *G06V 10/40* (2022.01)
  *H04W 4/024* (2018.01)
  *H04W 4/12* (2009.01)

(56) References Cited

U.S. PATENT DOCUMENTS

2019/0244035 A1    8/2019  Ida et al.
2021/0150196 A1*   5/2021  Yonetani .............. G06V 40/103
2022/0254161 A1    8/2022  Tatrai et al.

OTHER PUBLICATIONS

Wafaa M. Shalash, et al., "A Mobile Based Crowd Management System", International Journal of Advanced Research in Computer and Communication Engineering, vol. 6, Issue 6, Jun. 2017, 11 pages.

* cited by examiner

200B

METHOD AND SYSTEM FOR CROWD MANAGEMENT IN RELIGIOUS SITES

STATEMENT OF ACKNOWLEDGEMENT

The authors would like to acknowledge the support provided by the Deanship of Scientific Research (DSR) at King Fahd University of Petroleum & Minerals (KFUPM), Dhahran, Saudi Arabia.

BACKGROUND

Technical Field

The present disclosure is directed to Artificial Intelligence (AI), and more particularly to a method and a system for crowd management in a religious site.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Crowd management has become a crucial aspect of modern urban planning, particularly with the increasing population density in large cities. This is especially true during major events such as religious gatherings, sporting events, political rallies, and music concerts. As the global population continues to grow at an average rate of 82 million people per year, the frequency and scale of such gatherings are expected to rise, necessitating effective crowd management strategies. For example, religious gatherings, e.g., those in Makkah City, present unique challenges for crowd management. Pilgrims often prefer to sit near specific areas, such as the Kaaba, or near entrance and exit gates for easier access. This behavior of the pilgrims can lead to overcrowding in certain areas, especially the entrance and exit gates, which are perceived as more accessible. In some cases, this causes the pilgrims to overcrowd the entrance and exit gate areas even when the rest of the area is not at full capacity. This misperception of overcrowding not only diminishes the spiritual experience for those pilgrims who aim to be closer to sacred sites but also increases the risk of safety hazards, particularly in an event of an emergency. Additionally, unnecessary congestion in entrance and exit areas reduces the overall efficiency of the space in a religious site.

Thus, managing crowd density and movement effectively is critical for both enhancing the pilgrims' experience and ensuring their safety. Addressing these challenges requires a robust and intelligent crowd management system that can monitor and analyze crowd dynamics in real-time, ultimately improving both the spiritual and safety aspects of large gatherings.

For the above-listed reasons, smart cities are leveraging technology to automate the process of crowd management, with Artificial Intelligence (AI) playing a pivotal role. The AI solutions enhance the ability to model and analyze crowd dynamics, enabling officials to make quicker, more informed decisions in complex situations. In particular, computer vision techniques, specifically those based on automated crowd density monitoring, have gained significant attention. This automated crowd density monitoring involves using video feeds from surveillance cameras to analyze crowd behavior, count the number of people, and estimate crowd density. This method aims to generate accurate density maps from crowd images, facilitating better decision-making. These automated crowd density monitoring systems are not only vital for managing large crowds but have also proven useful in real-time applications, including traffic control, security management, and emergency response. Moreover, in the scenarios of the real-time applications, the need for accurate and timely crowd analysis becomes even more critical, particularly during events with large, unpredictable crowd gatherings.

However, traditional crowd management methods, such as manual counting, register-based approaches, and sensor-based techniques, are often time-consuming, inaccurate, and impractical in dynamic and unpredictable environments. This is because the traditional crowd management methods often fail to capture the dynamic nature of crowd movements, especially in complex environments with occlusions, varying perspectives, and non-uniform distributions of people. To overcome the challenges of the traditional crowd management methods, advancements in deep learning, particularly through Convolutional Neural Networks (CNNs), have been made to significantly improve the accuracy and efficiency of crowd counting and density estimation. Despite these advancements, the crowd counting remains challenging due to factors such as occlusion, complex backgrounds, and varying crowd densities. As a result, there is a need to enhance the accuracy of crowd counting in real-world environments.

Accordingly, it is one object of the present disclosure to provide a method and a system for actively managing the crowd in the religious site by way of text messaging.

SUMMARY

In an exemplary embodiment, a method for crowd management in a religious site is described. The method includes receiving registration information from a plurality of pilgrims, including mobile numbers for receiving text messages. The method includes periodically capturing, by a plurality of surveillance cameras, camera view images for views of each camera of respective portions of the religious site. The camera view images making up an entire area of the religious site. The method includes receiving the camera view images. The method includes automatically estimating, using an Artificial Intelligence (AI) algorithm, a number of pilgrims in each camera view image. The method includes automatically detecting a percentage of mobile numbers of pilgrims occupying overcrowded areas and sending text messages to the detected percentage of mobile numbers that direct the pilgrims to different areas where the camera view images have low crowd density that is substantially below a pre-set threshold, when the estimated number of pilgrims has a variance of crowd density in one of the camera view images that exceeds the pre-set threshold to indicate respective overcrowded areas.

In another exemplary embodiment, a system for crowd management in a religious site is described. The system includes a plurality of surveillance cameras located throughout the religious site for periodically capturing camera view images for views of each camera of respective portions of the religious site, the camera view images making up an entire area of the religious site, and a processing circuitry configured to receive registration information from a plurality of pilgrims, including mobile numbers for receiving text messages. The processing circuitry is configured to receive the camera view images. The processing circuitry is configured to automatically estimate, using an Artificial Intelligence (AI) algorithm, a number of pilgrims in each camera view image. The processing circuitry is configured to automatically detect a percentage of mobile numbers of pilgrims occupying overcrowded areas and send text messages to the detected percentage of mobile numbers that direct the pilgrims to different areas where the camera view images have low crowd density that is substantially below a pre-set threshold, when the estimated number has a variance of crowd density in one of the camera view images that exceeds the pre-set threshold to indicate respective overcrowded areas.

In another exemplary embodiment, a non-transitory computer readable medium having instructions stored therein that, when executed by one or more processor, cause the one or more processors to perform a method for crowd management in a religious site is described. The method includes receiving registration information from a plurality of pilgrims, including mobile numbers for receiving text messages. The method includes periodically capturing, by a plurality of surveillance cameras, camera view images for views of each camera of respective portions of the religious site. The camera view images making up an entire area of the religious site. The method includes receiving the camera view images. The method includes automatically estimating, using an Artificial Intelligence (AI) algorithm, a number of pilgrims in each camera view image. The method includes automatically detecting a percentage of mobile numbers of pilgrims occupying overcrowded areas and sending text messages to the detected percentage of mobile numbers that direct the pilgrims to different areas where the camera view images have low crowd density that is substantially below a pre-set threshold, when the estimated number of pilgrims has a variance of crowd density in one of the camera view images that exceeds the pre-set threshold to indicate respective overcrowded areas.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
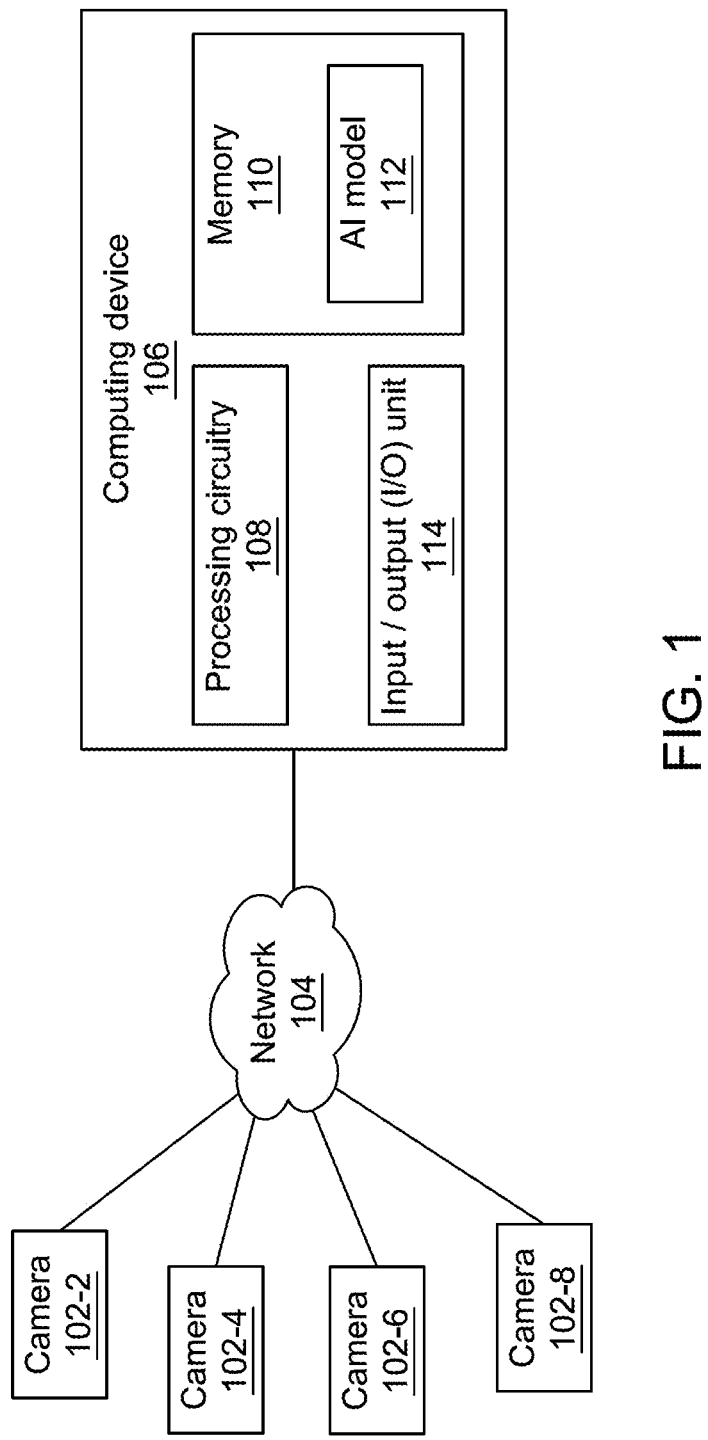
FIG. 1 is an exemplary diagram of a computing device configured for managing crowd in a religious site, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and a method for performing crowd management in a religious site. To perform the crowd management, the method includes receiving registration information from a number of pilgrims, including mobile numbers for receiving text messages. The method further includes periodically capturing, by a number of surveillance cameras, camera view images for views of each camera of respective portions of the religious site. The method further includes automatically estimating a number of pilgrims in each camera view image using an Artificial Intelligence (AI) algorithm. The method includes automatically detecting a percentage of mobile numbers of pilgrims occupying overcrowded areas and sending text messages to detected mobile numbers that direct the pilgrims to different areas where the camera view images have low crowd density.

Referring now to FIG. 1, the present disclosure provides an exemplary diagram 100 of a computing device 106 configured for managing crowd in a religious site, according to certain embodiments. The computing device 106 is configured to perform the crowd management in the religious site. The religious site is a location that holds spiritual, historical, or cultural significance to a particular religious group. The religious site is often a place of worship, pilgrimage, or meditation, where people gather to perform rituals, prayers, or seek spiritual fulfillment. Examples of the religious site may include, but are not limited to, a holy site or region, having temples, churches, mosque, shrines, and synagogues. In order to perform the crowd management at the religious site, the computing device 106 may be configured to receive registration information from a large number of pilgrims, on the order of several million people. The registration information may include mobile numbers of each pilgrim associated with the religious site for receiving text messages.

Apart from the mobile numbers, the registration information associated with each of the large number of pilgrims may include a name, an age, a gender, an arrival and departure information, and the like. In an embodiment, the registration information may be captured from the pilgrims prior to a date of a religious event (e.g., a hajj event, an easter event, etc.) at the religious site by enabling each of the pilgrims to register themselves in advance for attending the religious event. For example, each pilgrim may register themselves via an online portal associated with the religious site or during a check-in process at the religious site. Examples of the computing device 106 may include a server computer or cloud service, and the like.

Further, a number of surveillance cameras may be configured to periodically capture camera view images for views of each camera of respective portions of the religious site. In other words, the surveillance cameras may be configured to capture the camera view images for the views of each camera of the respective portions of the religious site during the religious event in real-time, repeatedly after every 15 minutes. The surveillance cameras may be installed with the religious site. As depicted in the FIG. 1, the surveillance cameras may correspond to a camera 102-2, a camera 102-4, a camera 102-6, and a camera 102-8. For ease of explanation, only four cameras are shown in FIG. 1, however any number of surveillance cameras may be present within the religious site. Examples of the surveillance cameras may include, Closed-Circuit Television (CCTV) cameras, Infrared (IR) cameras, 360-degree cameras, wireless cameras, thermal cameras, bullet cameras, dome cameras, and the like.

The surveillance cameras may be communicatively coupled with the computing device 106 via a network 104. In other words, surveillance cameras are configured to communicate with the computing device 106 using the network 104. Examples of the network 104 may include, but are not limited to, a Wide Area Network (WAN), a Local Area Network (LAN), a wireless network, a mobile network, a Virtual Private Network (VPN), an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, or some combination thereof. In an embodiment, the camera view images make up an entire area of the religious site. Further, the surveillance cameras may be configured to transfer the camera view images periodically (e.g., after every 15 minutes) to the computing device 106 over the network 104. The computing device 106 may be configured to receive the camera view images from the surveillance cameras.

Upon receiving the camera view images, the computing device 106 is configured to automatically estimate a number of pilgrims in each camera view image. The estimation of the number of pilgrims in each camera view image is performed using an Artificial Intelligence (AI) algorithm implemented using an AI model 112. The AI model 112 may reside within a memory 110 of the computing device 106. Further, the AI algorithm implemented using the AI model 112 to estimate the number of pilgrims in each camera view image may be a type of convolutional neural network (CNN) such as a Congested Scene Recognition Network (CSRNet) and a You Only Look Once (YOLO) network. To estimate the number of pilgrims in each camera view image, the CSRNet includes a feature extraction Convolutional Neural Network (CNN) as a front-end for two-dimensional (2D) feature extraction and a dilated CNN for a back-end. In an embodiment, the AI model 112 may correspond to a CNN model.

Once the number of pilgrims is estimated in each camera view image, the computing device 106 is configured to perform a check to estimate a variance of crowd density in each of the camera view images. Further, based on the check performed, upon estimating the variance of the crowd density in one of the camera view images to be above a pre-set threshold (e.g., 70%). The one of the camera view images may be indicated as overcrowded areas within the religious site. In other words, an area in the one of the camera view images may be marked as an overcrowded area within the religious site. The overcrowded area may correspond to an area in the religious site where the number of pilgrims present exceeds an optimal capacity (e.g., an area with a capacity of 250 pilgrims) specified for the area. Further, upon estimating the variance of the crowd density in one of the camera view images to be above the pre-set threshold, the computing device 106 is configured to automatically detect a percentage of mobile numbers of pilgrims occupying the overcrowded areas and sending text messages to the detected mobile numbers. Further, each pilgrim including a mobile number of the detected percentage of mobile numbers in that camera view image is marked by a bounding box using the YOLO network. Further, the text messages are sent to the mobile number of each pilgrim present in the camera view image indicating the overcrowded area. In an embodiment, the text messages include instructions that direct the pilgrims to different areas where the camera view images have low crowd density that is substantially below the pre-set threshold (e.g., 70%). This complete method of performing the crowd management at the religious site is further explained in detail in conjunction with FIG. 2 to FIG. 12.

The memory 110 may be a volatile memory, such as a Random-Access Memory (RAM), or a non-volatile memory such as a Read Only Memory (ROM), an Erasable Programmable Read Only Memory (EPROM), a flash memory, and the like. The memory 110 may be configured to store one or more computer-readable instructions or routines that when executed may cause the computing device 106 to perform the crowd management in the religious site. The memory 110 may perform the crowd management in conjunction with a processing circuitry 108. In other words, the processing circuitry 108 may be configured to execute the one or more computer-readable instructions stored within the memory 110 to perform the crowd management at the religious site. The processing circuitry 108 may be implemented as one or more microprocessors, microcomputers, microcontrollers, Digital Signal Processors (DSPs), Central Processing Units (CPUs), logic circuitries, and/or any devices that process data based on operational instructions.

In an embodiment, the computing device 106 may also include an Input/Output (I/O) unit 114. The I/O unit 114 may be used by a user (e.g., a site manager or an event coordinator) to provide inputs (such as a value for the pre-set threshold for each area of the religious site, a periodicity of receiving the camera view images for each of the surveillance cameras, an input to automatically adjust a camera view of each of the surveillance cameras, and the like) to the computing device 106. Further, the I/O unit 114 may be used to display results, e.g., the camera view images, the number of pilgrims estimated in each area, the overcrowded area, etc., based on processing performed by the computing device 106 for managing the crowd in the religious site. In some embodiments, apart from performing the crowd management at the religious site, the computing device 106 may be configured to perform the crowd management at other crowded sites, such as stadiums, marketplaces, concert venues, exhibition and conference halls, and the like.

Figure 2A:
FIG. 2A is an exemplary pictorial representation depicting disparity of crowd density at a religious site, according to certain embodiments.

Referring now to FIG. 2A, the present disclosure provides an exemplary pictorial representation 200A depicting disparity of crowd density at a religious site, according to certain embodiments. The religious site may be, for example, a Mosque. As shown in the FIG. 2A, the crowd density in the religious site is high in areas marked as 202A. Whereas the crowd density is low in the areas of the religious site that are marked as 204A. This disparity in the crowd density in different areas (also referred to as different portions) of the religious site presents several challenges, including safety risks from overcrowding in specific areas, which can lead to accidents or stampedes. Further, this disparity in the crowd density also complicates the crowd management, making it difficult for the site manager or the event managers to ensure smooth movement and access. Additionally, this uneven distribution of people (i.e., pilgrims) can lead to inefficient use of space of the religious site, causing congestion in some areas of the religious site, affecting the overall experience and operational efficiency. Therefore, due to the above-listed issues, real-time monitoring of the religious site is required to enhance the experience of the pilgrims and to maintain safety and balance.

One of most significant examples of massive crowds occurs during a Hajj pilgrimage (i.e., the religious event) in Makkah and Madina, Saudi Arabia. In 2019, the Hajj pilgrimage attracted over 2.5 million people, with the number of pilgrims continuing to grow each year. Managing such large-scale events presents a unique challenge, underscoring the importance of accurate and efficient crowd density estimation and management techniques.

To perform the crowd management, particularly in such large-scale events such as religious ceremonies, sports events, festivals, and political rallies, often involves estimating the crowd density or counting the number of people in a specific scene or area. Traditionally, crowd counting was performed manually by analysts who visually assessed each area of a site (e.g., the religious site), tallied the number of people in specific areas, and then extrapolated this data including the number of people to estimate a total crowd size of an event (e.g., the religious event). However, this traditional manual method is time-consuming, labor-intensive, and prone to significant errors.

To overcome the challenges of the traditional manual method, a Jacobs' method can be used for the crowd counting, especially in religious gatherings, protests, and rallies. The Jacobs' method divides each crowd area into sectors, calculates an average number of people in each sector, and then multiplies a value of the average number of people with the total number of filled sectors to estimate an overall crowd size. Despite the use of the Jacobs' method, the Jacobs' method is relatively simplistic and does not capture the complexities of crowd distribution in highly dynamic environments.

In recent years, a Spatial Fully Convolutional Network (SFCN) has become a popular architecture for performing the crowd counting. The SFCN leveraged deep learning techniques to estimate the crowd density by analyzing a spatial distribution of people in each image captured using a number of surveillance cameras installed at the site. The SFCN has been widely adopted by for its ability to handle the complexities of crowd management with greater accuracy compared to other conventional methods. However, a key disadvantage of the SFCN is its high computational cost, requiring significant processing power and memory, particularly when dealing with large-scale crowd scenes captured by many cameras. Additionally, accuracy may suffer in highly dense or occluded crowd situations, where each person is hard to distinguish.

A crowd density estimation typically follows two main approaches a direct approach and an indirect approach. The direct approach involves tracking and counting people in real-time, provided they can be accurately segmented from each image. The indirect approach, on the other hand, uses various image processing techniques, such as pixel-based analysis, texture-based analysis, and corner point-based analysis to relate visual features to crowd densities. These direct and indirect approaches rely on machine learning algorithms to predict crowd sizes without needing to track every individual. Therefore, the present disclosure discloses the method and the system (e.g., the system 100) for effectively performing the crowd management at such large-scale events occurring at religious sites.

For performing the crowd management, the surveillance cameras may be installed throughout the religious site. Each of the surveillance cameras may be configured to periodically capture camera view images of the religious site. The camera view images taken by each camera may together make up the entire area of the religious site. Further, the surveillance cameras may send the camera view images to the computing device 106 to perform the crowd management at the religious site.

Figure 2B:
FIG. 2B is an exemplary pictorial representation depicting crowd of pilgrims at a religious site, according to certain embodiments.

Referring now to FIG. 2B, the present disclosure provides an exemplary pictorial representation 200B depicting a crowd of pilgrims at a religious site, according to certain embodiments. As depicted in FIG. 2B, the religious site, for example, may include the mosque. Other religious sites may include temples, churches, shrines, synagogues, and the like. As depicted in FIG. 2B, the religious site includes the pilgrims. A pilgrim may be defined as an individual who travels to a sacred site (i.e., the religious site) as part of a spiritual journey, often as an expression of faith, devotion, or religious obligation. In some embodiments, apart from the religious site, the crowd management may be performed at other sites, such as stadiums, e marketplaces, concert venues, exhibition and conference halls, and the like.

Figure 3:
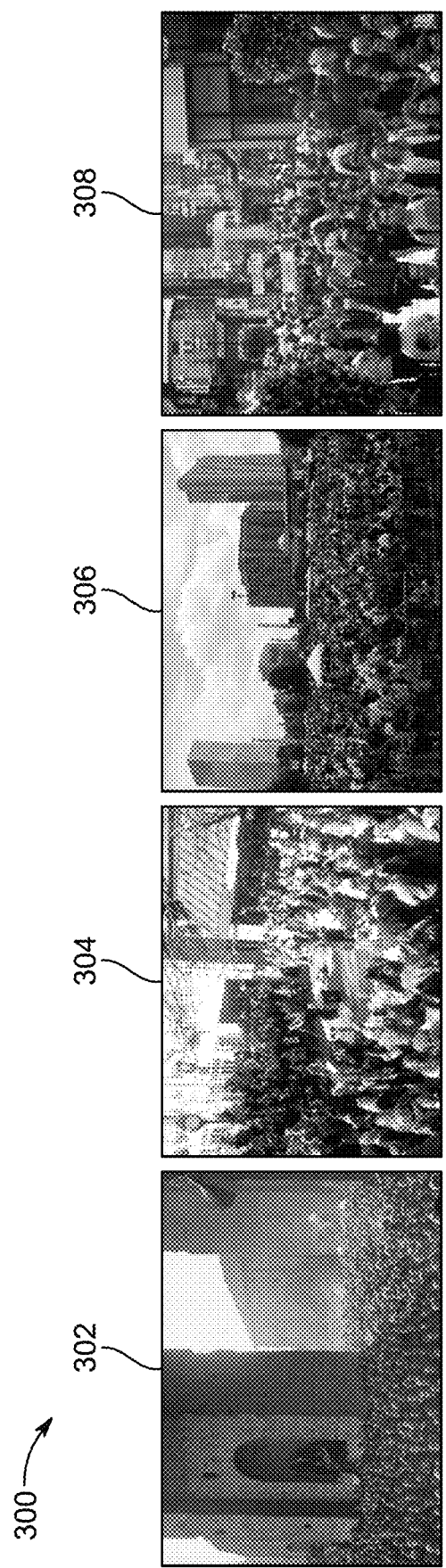
FIG. 3 is a pictorial representation depicting some sample images in an exemplary dataset used for training an Artificial Intelligence (AI) model, according to certain embodiments.

Referring now to FIG. 3, the present disclosure provides a pictorial representation 300 depicting a number of images in an exemplary dataset used for training an AI model (same as the AI model 112), according to certain embodiments. In an embodiment, the AI model 112 may be trained using the AI algorithm. The AI algorithm may correspond to convolutional neural networks, such as but not limited to, the CSRNet and the YOLO network. Further, the exemplary dataset used for training the AI model 112 may include the images associated with the religious site. The religious site is the location that holds spiritual, historical, or cultural significance to a particular religious group of people. These religious sites are often places of worship, pilgrimage, or meditation, where people gather to perform rituals, prayers, or seek spiritual fulfillment. These religious sites may include temples, churches, mosques, shrines, and synagogues. The images associated with the religious site may be, for example, an image 302, an image 304, an image 306, and an image 308. It should be noted that, for ease of explanation only four images are shown however, the dataset may include any number of images associated with the religious site.

By way of an example, the religious site may correspond to a mosque in a Shanghai city. Further, the dataset including the images may correspond to the dataset associated with the mosque in the Shanghai city. The dataset associated with the mosque in the Shanghai city is one of a largest datasets for crowd counting and crowd density estimation. This dataset consists of approximately 1,198 annotated images, characterized by a total of 330,165 people with centers of their heads annotated. This dataset is the largest, in terms of the number of annotated people. The dataset consists of two parts, a first part contains approximately 482 images, which are randomly taken from the Internet as well as from the mosque in a Makkah city. Further, a second part contains approximately 716 images taken from the busy streets of metropolitan areas in Shanghai city. Both parts of the dataset are divided into a training dataset and a testing dataset. Further, the training dataset is used for training the AI model using the AI algorithm to estimate the number of people (e.g., the number of pilgrims) to perform management of the crowd in a particular site (e.g., the religious site). Further, the testing dataset is used to test the AI model 112 for its ability to estimate the number of pilgrims. In an embodiment, a density of the crowd varies significantly between the two datasets, i.e., the training dataset and the testing dataset to train the AI model 112 to make accurate estimation of the crowd in real-time scenarios.

In order to train the AI model 112, the AI algorithm (e.g., the CSRNet and the YOLO network) analyzes crowd dynamics in real-world environments, such as public events or religious gatherings, by using multi-modal data (e.g., image data) from heterogeneous sensors (e.g., surveillance cameras). These AI algorithms can calculate the crowd density, track object (e.g., the person) positions, and detect abnormal events, providing insights to the AI model 112 for managing the crowd. In other words, a significant portion of the crowd density estimation is based on Computer Vision (CV) techniques, with two common approaches, one directly counts the number of people using the YOLO network, and another by generating a crowd density map using the CSRNet, where pixel values represent the crowd density and can be summed up to estimate the number of people in each image provided as an input to the AI model 112. In an embodiment, among the above AI algorithms for performing the crowd density estimation, the CSRNet is considered one of a most effective technique for both crowd counting and a crowd density map generation, outperforming other exiting traditional methods. Therefore, for training the AI model 112, the CSRNet is preferably used as a baseline technique for estimating the number of pilgrims at the religious site.

To train the AI model based on the images, let $D(x_m)$ be a density map function representing the crowd in an image $x_m$. In an embodiment, the crowd density map is used as a ground truth for the number of people in an image (e.g., the image $x_m$). Further, a sum of all point annotations in the crowd density map corresponds to the total number of people. In an embodiment, the point annotations are markers or labels placed on specific points of interest (e.g., a center point of a head of each person) within the dataset including the images. The point annotations guide the AI model 112 to perform an object (e.g., a person) detection, tracking, or counting by providing a labeled reference to the object while performing the crowd density estimation. Further, to improve the training process, a Gaussian filter is applied to the crowd density map to remove noise caused by point annotations, which are sometimes hard for the AI model 112 to interpret. The Gaussian filter is a type of a linear filter used in image processing and signal processing to smooth or blur data in an image. A formula for generating the crowd density map for the image $x_m$ is depicted via an equation 1 below:

$$D^{gt}(x_m) = \sum_{m=1}^{M} \frac{1}{\sqrt{2\pi}\sigma} \exp\left(-\frac{\|x_m - z_m\|_2^2}{2\sigma^2}\right) \quad (1)$$

In the above equation 1, '$z_m$' represents a location of each head (point annotation) in the crowd, and '$\sigma$' is the variance of the Gaussian filter. While the CSRNet uses a fixed value for the Gaussian filter, it is known that head sizes vary among individuals. Therefore, an adaptive filter is applied to dynamically change behavior of the Gaussian filter in order to suit the specific content or noise characteristics of the image at any given moment, leading to more efficient and targeted processing. In the adaptive filter, the variance '$\sigma$' is adjusted based on a distance to a nearest neighbor using n: $\sigma_n \propto d_n$, where '$d_n$' is the distance to the nearest neighbor.

Further, to increase an accuracy of the AI model 112 for estimating the crowd density, a loss function 'L' is used to minimize a difference between the ground-truth crowd density map and the predicted crowd density map. The loss function 'L' is calculated using an equation 2:

$$L = \sum_{m=1}^{M} F(D^{gt}(x_m) - D^{est}(x_m)) \quad (2)$$

In the above equation 2, 'F(•)' represents a distance function, and '$D^{est}$' is an estimated crowd density map, i.e., the predicted crowd density map. In particular, the AI model 112 (also referred to as a CNN model) is trained using Shanghai-Tech datasets, which already include ground-truth annotations.

Once the model is trained using the exemplary dataset (i.e., the Shanghai-Tech dataset), a performance of the AI model 112 is evaluated using a Mean Absolute Error (MAE) and a Mean Squared Error (MSE), which are calculated using an equation 3 and an equation 4 respectively:

$$MAE = \frac{1}{N}\sum_{i=1}^{N} |C_i - C_i^{GT}| \quad (3)$$

$$MSE = \frac{1}{N}\sum_{i=1}^{N} |C_i - C_i^{GT}|^2 \quad (4)$$

In the above equation 3 and 4, 'N' is the number of images in a test sequence, and $$`C_i^{GT}`,$$

is a ground-truth count for an image 'i', i.e., a last image in the test sequence. Further, '$C_i$' presents an estimated count of the number of pilgrims in each image. The '$C_i$' is calculated using an equation below:

$$C_i = \sum_{l=1}^{L}\sum_{w=1}^{W} z_{l,w} \quad (5)$$

In the equation 5, 'L' and 'W' are a length and a width of the crowd density map, respectively, while '$z_{l,w}$' is a pixel at (l,w) of the generated crowd density map.

Additionally, a Peak Signal-to-Noise Ratio (PSNR) and a Structural Similarity Index (SSIM) are used to assess a quality of the predicted crowd density map. The PSNR and the SSIM are calculated using preprocessing guidelines, which include resizing the crowd density map to match a size of an original input image present in the dataset, followed by interpolation and normalization.

Further, a YOLO network is used for detecting the objects (i.e., the number of pilgrims) in the image (e.g., the image $x_m$). The processing of the image performed using the YOLO network is further explained in detail in conjunction with FIG. 6. Once the AI model 112 is trained, the AI model 112 is tested on the Shanghai-Tech dataset, which contains two parts, i.e., a part-A including images of crowded scenes, and a part-B including images of less crowded scenes. During testing of the AI model 112, it can be observed that the YOLO network achieves an accuracy of 82.1% on the Shanghai-Tech dataset. A Table 1 presents values of the MAE and the MSE for both the AI algorithms, i.e., the CSRNet and the YOLO network (e.g., a YOLO version 5 network, i.e., YOLOv5 network) used for training the AI model 112.

| MODEL | DATASET | MAE | MSE |
| --- | --- | --- | --- |
| CSRNet | Part-A | 68.5 | 115.6 |
| CSRNet | Part-B | 12.6 | 19.7 |
| YOLOv5 | Part-A | 64.8 | 97.3 |
| YOLOv5 | Part-B | 10.4 | 12.9 |

Additionally, results of the processing performed by the AI model 112 using the CSRNet and the YOLO network is depicted in FIGS. 4A, 4B, 5A, and 5B.

Figure 4A:
FIG. 4A-4B is an exemplary pictorial depiction of a number of pilgrims estimated in a camera view image, according to certain embodiments.
Figure 4B:
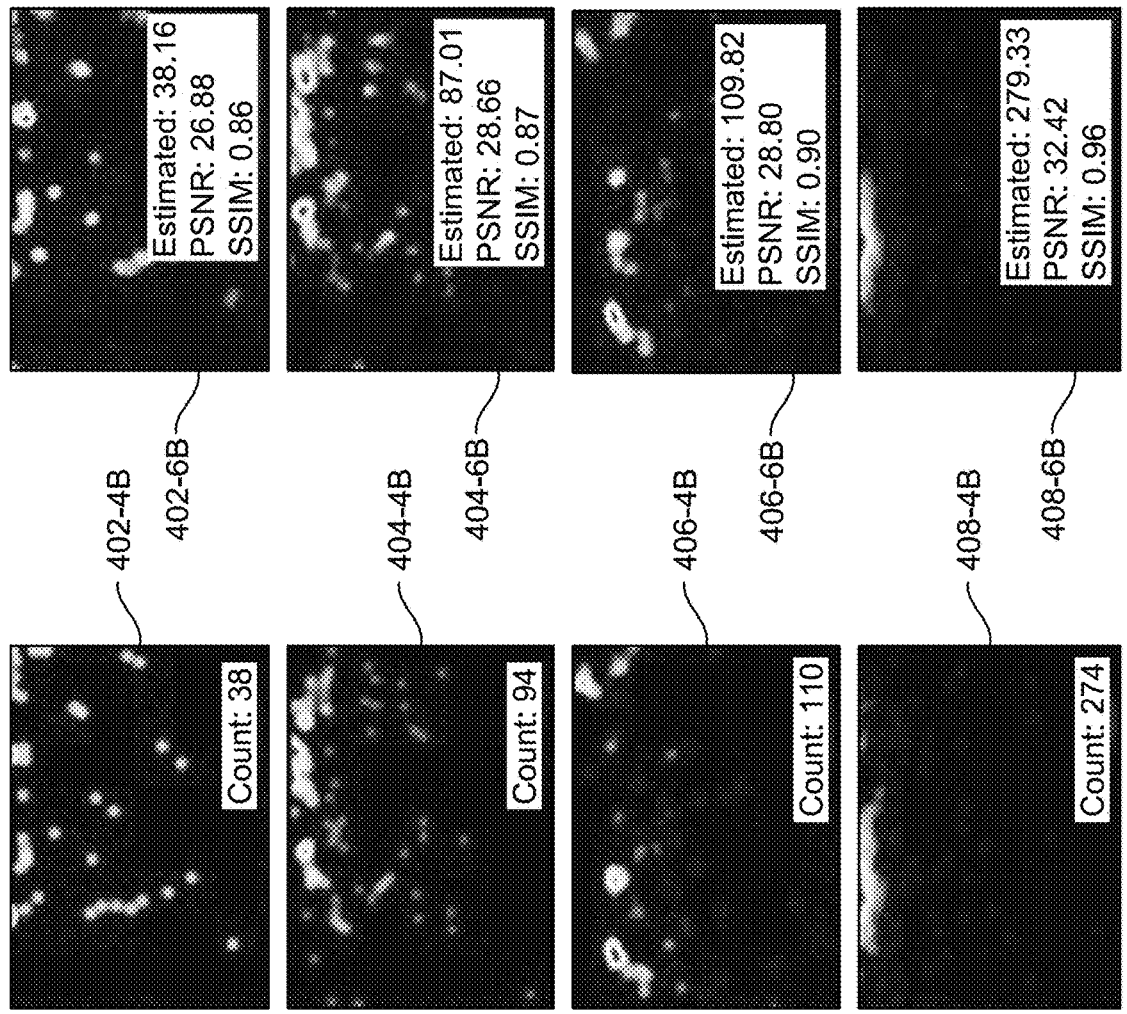
Figure 4B:
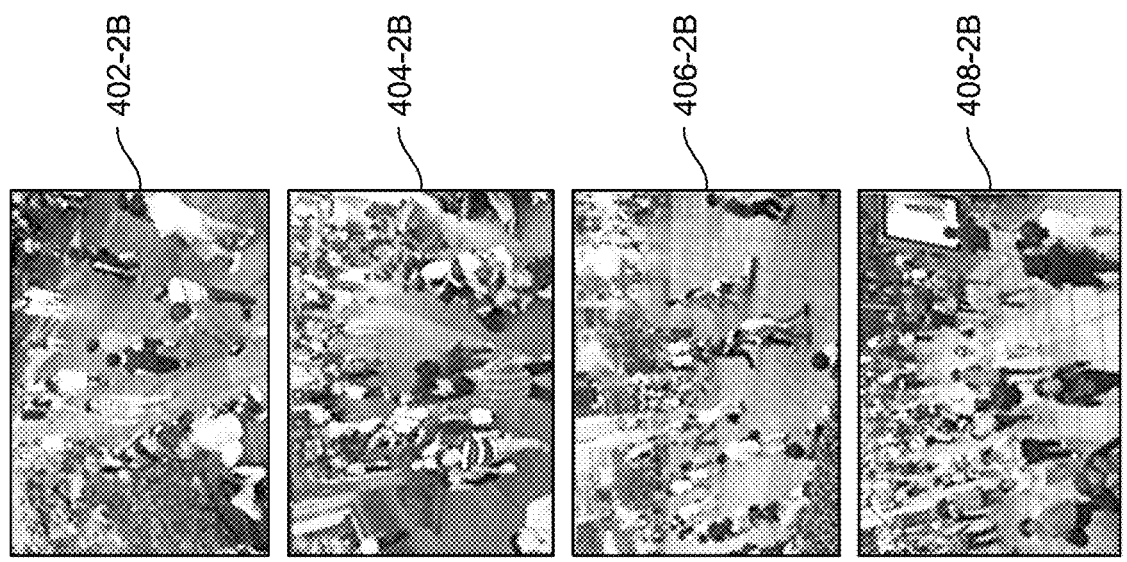

Referring now to FIGS. 4A and 4B, the present disclosure provides an exemplary pictorial depiction of a number of individuals in a camera view image, according to certain embodiments. An exemplary pictorial depiction 400A in FIG. 4A represents the results of an object detection, i.e., the detection of each person (also referred to as a pilgrim) performed by the YOLO network in a camera view image 402A. The camera may be a surveillance camera. Example of the surveillance camera may include a CCTV camera, an IR camera, a 360-degree camera, a wireless camera, a thermal camera, a bullet camera, a dome camera, and the like. In FIG. 4A, the camera view image 402A may correspond to an image taken by a CCTV camera installed outside a shop in a marketplace. Once the camera view image 402A is captured by the camera (e.g., the camera 102-2), the camera view image 402A is transferred by the camera to the computing device 106 via the network 104.

Upon receiving the camera view image 402A, the AI model 112 of the computing device 106 is configured to process the camera view image 402A to estimate the number of persons in the camera view image 402A. The AI model 112 may process the camera view image 402A using the AI algorithm, i.e., the YOLO network. As depicted in the FIG. 4A, the camera view image 402A may be an image (i.e., a less crowded image) taken by the surveillance camera. Further, the object may correspond to the person (also referred to as an individual). Each bounding box, i.e., a bounding box 404A, represents the person detected in the camera view image 402A. Further, as depicted, the object in each bounding box is marked by a unique reference numeral. For example, the object, i.e., the person in the bounding box 404A is marked with a unique reference numeral as 'person: 0.9082'. In this case, a confidence value of the object predicted by the YOLO network is greater than 0.5, i.e., 0.9082. Hence the object is detected as a person. The YOLO network is a real-time object detection network that processes an entire image, i.e., the camera view image 402A in a single pass through the YOLO network. The YOLO network divides the camera view image 402A into a grid and predicts bounding boxes, class labels, and confidence scores for each object (i.e., each individual) within the grid. The YOLO network treats object detection as a single regression problem, making it fast and efficient for real-time applications. A processing performed by the YOLO network for detecting the object is further explained in detail in conjunction with FIG. 6.

Further, an exemplary pictorial depiction 400B in FIG. 4B, represents results of the analysis performed by the CSRNet. For example, based on processing of a camera view image 402-2B, the number of people estimated in the camera view image 402-2B may correspond to 38 individuals, depicted as 'count-38' in an image 402-4B. In other words, an actual number of individuals in the camera view image 402-2B may be 38 individuals. Further, based on the processing performed on the camera view image 402-2B using the CSRNet, the number of people estimated in the camera view image 402-2B may be 38.16, i.e., estimated: 38.1604, as depicted via an image 402-6B. Further, a PSNR and a SSIM for the camera view image 402-2B may be determined to 26.88 and 0.86 respectively, as depicted in the image 402-6B. The PSNR is a metric used to assess a quality of the predicted crowd density map by comparing the estimated number of individuals with the actual number of individuals. Further, the SSIM measures a structural similarity between two images, i.e., the predicted crowd density map and the image with the actual number of individuals. The SSIM is generated based on comparison of luminance, contrast, and structure of the camera view image 402-2B and the image 402-4B to assess how similar they are in terms of visual content. In a similar manner, results (i.e., the estimated number of people, the PSNR, the SSIM) of processing performed for each camera view image, i.e., a camera view image 404-2B, a camera view image 406-2B, and a camera view image 408-2B is represented via an image 404-6B, an image 406-6B, and an image 408-6B, respectively. Further, an actual number of individuals in the camera view image 404-2B, the camera view image 406-2B, and the camera view image 408-2B is represented via an image 404-4B, an image 406-4B, and an image 408-4B, respectively.

In an embodiment, the CSRNet includes a CNN (i.e., the CNN model) as the front-end for the 2D feature extraction and a dilated CNN for the back-end. The CSRNet is a deep learning-based model designed for crowd density estimation and scene recognition in highly congested environments. The CSRNet is a CNN architecture to analyze and estimate the number of individuals in crowded scenes, providing accurate crowd density maps and handling challenges such as occlusion and scale variations. The CSRNet is particularly effective in real-time applications like crowd management in large public events and religious sites. In particular, in the CSRNet, the CNN serves as the front-end to extract 2D features from an input image (e.g., the camera view image 402-2B), such as textures, edges, and spatial patterns. Further, the dilated CNN in the back-end is used to enhance the CNN's ability to capture contextual information over a larger receptive field without losing resolution, which is crucial for accurately estimating crowd density in congested scenes. The contextual information, for example, may include, crowd density patterns, object proximity, spatial layout, and the like. This combination of the CNN and the dilated CNN allows the CSRNet to generate a detailed crowd density map, which are used to estimate the number of individuals in the camera view image by summing pixel values of the crowd density map.

Figure 5A:
FIG. 5A-5B is another exemplary pictorial depiction of a number of pilgrims estimated in another camera view image, according to certain embodiments.
Figure 5B:
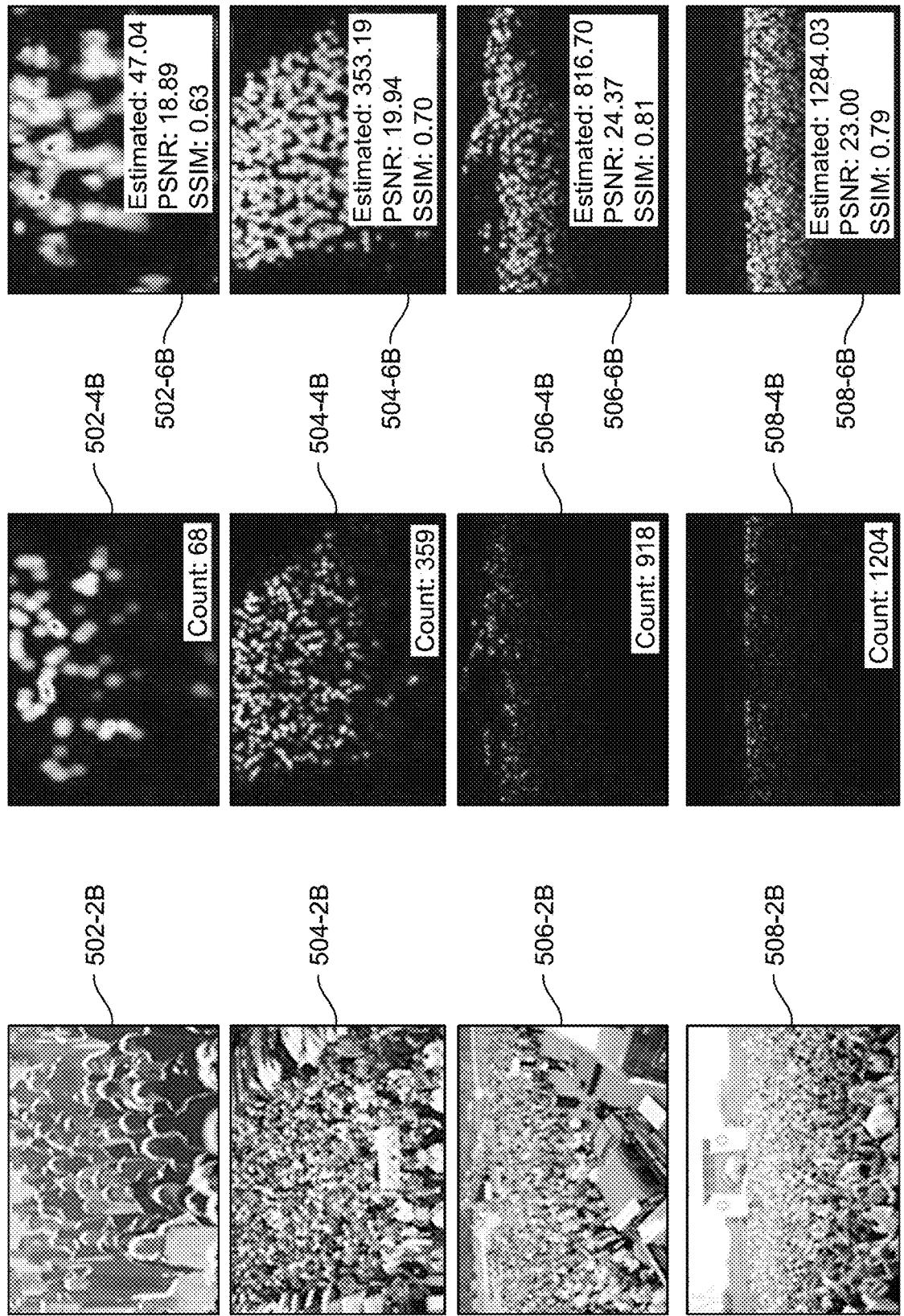

Referring now to FIG. 5A-5B, the present disclosure provides another exemplary pictorial depiction of a number of pilgrims estimated in a camera view image, according to certain embodiments. Similarly, an exemplary pictorial depiction 500A in FIG. 5A represents the results of an object detection, i.e., the detection of each person (also referred to as a pilgrim) performed by the YOLO network in a camera view image 502A. As depicted in the FIG. 5A, the camera view image 502A may be an image (i.e., less crowded image) taken by a surveillance camera installed in a street. In this case, the street may be a site for which the camera view image 502A is captured. Further, the object may correspond to a person (also referred to as an individual). Each bounding box, i.e., a bounding box 504A, represents the person detected in the camera view image 502A. Further, as depicted, the object in each bounding box is marked by a unique reference numeral. For example, the object, i.e., the person in the bounding box 504A is marked with a unique reference numeral as 'person: 33'.

Further, an exemplary pictorial depiction 500B in FIG. 5B, represents results of the analysis performed by the CSRNet. For example, based on processing of a camera view image 502-2B, the number of people estimated in the camera view image 502-2B may correspond to 68 people, depicted as 'count-68' in an image 502-4B. In other words, an actual number of people in the camera view image 502-2B may be 68 individuals. Further, based on the processing performed on the camera view image 502-2B using the CSRNet, the number of people estimated in the camera view image 502-2B may be 47.04, i.e., estimated: 47.04, as depicted via an image 502-6B. Further, a PSNR and a SSIM for the camera view image 502-2B may be 18.89 and 0.63 respectively, as depicted in the image 502-6B. In a similar way, results (i.e., the estimated number of individuals, the PSNR, the SSIM) of processing performed for each camera view image, i.e., a camera view image 504-2B, a camera view image 506-2B, and a camera view image 508-2B is represented via an image 504-6B, an image 506-6B, and an image 508-6B, respectively. Further, an actual number of people in the camera view image 504-2B, the camera view image 506-2B, and the camera view image 508-2B is represented via an image 504-4B, an image 506-4B, and an image 508-4B, respectively.

Figure 6:
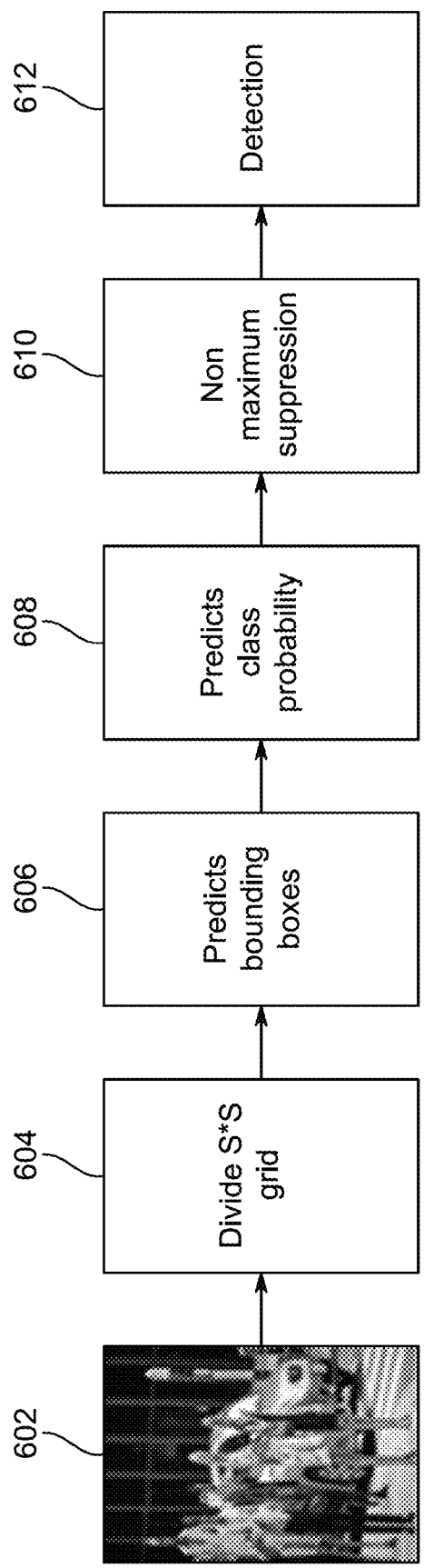
FIG. 6 is an exemplary diagram representing a process of detecting a number of pilgrims in a camera view image, according to certain embodiments.

Referring now to FIG. 6, the present disclosure provides an exemplary diagram 600 representing a process of detecting a number of pilgrims in a camera view image, according to certain embodiments. In order to detect the number of pilgrims (also referred to as the number of people) in each camera view image, the YOLO network is used. Each pilgrim in the camera view image may correspond to an object. Further, the YOLO network is configured to detect the object with the confidence value greater than 0.5. In other words, the YOLO network is configured to consider bounding boxes that have the confidence value to be above 0.5 (e.g., a pre-defined confidence value) as valid detections, ensuring that the objects (i.e., the people) within the bounding boxes having the confidence value greater than 0.5 are sufficiently likely to be correct. In an embodiment, the object detection by the YOLO network involves identifying and locating objects within an image (e.g., the camera view image) by drawing a bounding box around the objects and classifying the objects. In the context of person detection (i.e., a pilgrim detection), the goal is to recognize and label each individual in the image as a 'person'. To detect the objects (i.e., the people) in real-time in the camera view image, the YOLO network uses a deep CNN.

In an embodiment, in order to detect the objects (e.g., the individuals) in a camera view image, initially at step 602, the camera view image is received as an input by the YOLO network. Upon receiving the camera view image, at step 604, the YOLO network divides the camera image into an S×S grid. In an embodiment, a value of the S is defined by a user (e.g., an administrator, such as the site manager, or a developer) while configuring the YOLO network for object detection. For instance, if S=7, the camera view image is divided into a 7×7 grid, resulting in 49 grid cells. Each grid cell is responsible for detecting the objects whose center falls within that particular grid cell.

Once the objects within each grid cell are identified, at step 606, each grid cell is configured to predict bounding boxes and class probabilities for the objects that fall within a region of a respective grid cell. This grid structure allows the YOLO network to simultaneously predict multiple objects at different locations in the camera view image. A bounding box is defined by its center coordinates (x, y), a width (w), and a height (h). The YOLO network predicts multiple bounding boxes per grid cell.

Once the bounding box for each object is predicted, at step 608, the YOLO network predicts a class probability, i.e., the 'person' for each bounding box. This means for each bounding box, the YOLO network predicts a likelihood of the object belonging to a particular class, e.g., 'person', 'car', 'dog', etc.). In an embodiment, the class probability is a value between 0 and 1, indicating a likelihood of the presence of a specific object in the bounding box.

Further, at step 610, a Non-Maximum Suppression (NMS) technique is applied to remove redundant bounding boxes for one object in the camera view image. The NMS technique is used to keep only a most confident bounding box for each object and discard other bounding boxes that overlap significantly (based on an overlapping threshold, e.g., 50%). Further, at step 612, the most confident bounding box with the detected object is represented to the user.

By way of an example, suppose the YOLO network may be the YOLOv5 network. The YOLOv5 network is structured into four key components, i.e., an input, a backbone, a neck, and a prediction. The YOLOv5 network employs a mosaic enhancement technique during data augmentation, which combines random cropping, zooming, and other transformations to diversify background of the camera view image and improve robustness of the YOLO network. For person detection, the YOLOv5 network requires four input parameters, i.e., the camera view image, the YOLOv5 network configuration file, the trained YOLOv5 network weights, and a text file containing a class label, e.g., 'person'. The YOLOv5 network configuration file includes information such as number of layers, an image type of the camera view image, and the like. A process for person detection by the YOLOv5 network begins by obtaining the width (w) and the height (h) of the camera view image. Next, colors for the class label (i.e., the person) and the bounding boxes are set, which will be used to annotate detected objects. Further, using the YOLOv5 network configuration file and trained YOLOv5 network weights, the YOLOv5 network is initialized, creating the deep CNN.

The camera view image is then passed through the YOLOv5 network, where the YOLOv5 network processes the camera view image using its learned network weights. In an embodiment, the YOLOv5 network uses multiple output layers to generate predictions, detect and classify objects, i.e., the people in the camera view image. In the case of person detection, a region including the person is highlighted with the bounding box, marking a location of the detected person.

Figure 7:
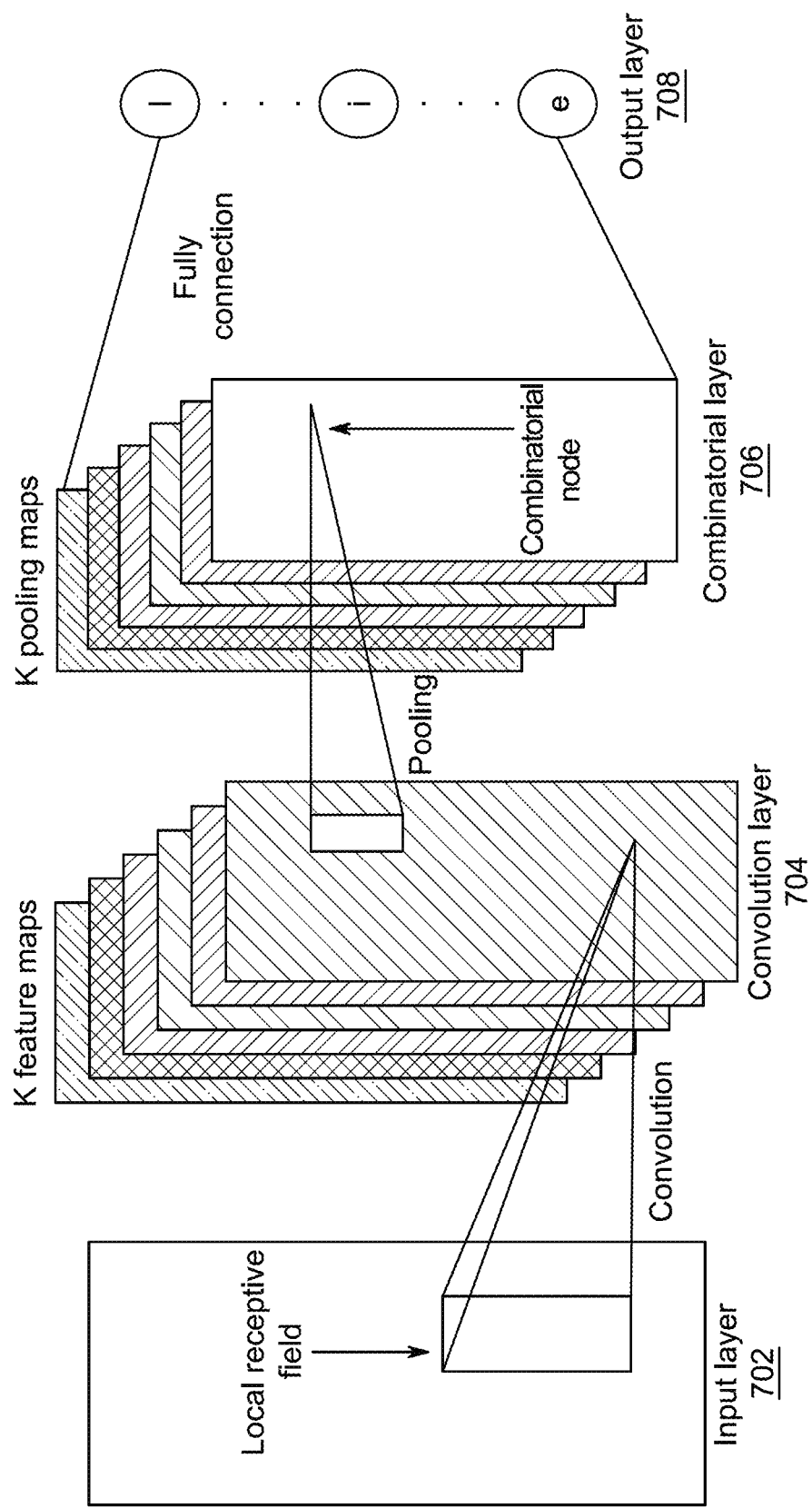
FIG. 7 is an exemplary diagram representing a structure of a Convolution Neural Network (CNN) model, according to certain embodiments.

Referring now to FIG. 7, the present disclosure provides an exemplary diagram 700 representing a structure of a CNN model (same as the AI model 112), according to certain embodiments. The CNN model may also be referred to as the CNN. The CNN is a type of Artificial Neural Network (ANN) designed to process and analyze visual data, such as images (same as the camera view images). The CNN takes image pixels as input and performs tasks like image classification, object detection, and face recognition for objects (i.e., the people) present within the image. For instance, suppose the CNN has been trained to perform image classification for objects, e.g., 'persons', 'cat', or 'dog' present in each input image. In this case, once the CNN is trained based on a training dataset (e.g., images of persons, cats, and dogs), then during real-time image classification, when an image includes an object, e.g., a cat. The CNN takes the image pixels as the input, process the image pixels, and assigns a class label, to the object in the image, i.e., 'cat'. As depicted in the FIG. 7, the structure of the CNN consists of several layers, such as an input layer 702, multiple hidden layers, and an output layer 708. The multiple hidden layers typically include an alternate layer between a convolutional layer of combination layers 704 and pooling layers (depicted as combinatorial layers 706), followed by one or more fully connected layers. The purpose of these layers of the CNN is to progressively extract features from the image and make a final classification decision for an object in the image.

The input layer 702 is a first layer in the CNN. The input layer 702 is responsible for receiving a raw image data (pixel values) as an input. The input layer 702 feeds the raw image data into the CNN, typically as a matrix of pixel values (for example, a 2D matrix for a Red Green Blue (RGB) image, with height, width, and color channels). The input layer 702 does not perform any computations but prepares the raw input image for further processing by following layers (i.e., the multiple hidden layers) of the CNN. A convolution process and a pooling process are two essential processes that are always included in the CNN for the object detection and classification.

In particular, in the convolution process, a convolutional layer of the convolution layers 704 applies a set of filters (or kernels) to the input image (i.e., a raw image) or to an output image of a previous layer, e.g., the input layer 702. Each filter in the set of filters detects a specific feature in the input image, such as edges, textures, or patterns, by convolving over the input image. Further, the parameters (e.g., weights, biases, etc.) of the set of filters are learned during a training process of the CNN (i.e., the AI model 112), allowing the CNN to extract meaningful features from the input image while maintaining spatial relationships. Furthermore, based on the extracted meaningful features, a feature map is generated. The spatial relationships refer to the relative positioning of objects (e.g., the people (also referred to as the pilgrims)) or the features (e.g., the edges, the textures, etc.) in the input image, maintaining an arrangement and a proximity of each object.

Further, in the pooling process, a pooling layer, e.g., a combinatorial layer of the combinatorial layer 706 is used to reduce spatial dimensions of feature maps generated by the convolutional layers 704. During the pooling process, the number of parameters and computational resources (utilization of the CPU and memory, etc.) required for processing the input image are reduced, making the CNN more efficient. In an embodiment, most frequent pooling process in the CNN includes a maximum pooling process and an average pooling process. Once the number of parameters is reduced by selecting the most relevant parameters, a pooling map is generated. The pooling map is the result of applying the pooling process (such as the maximum pooling process or the average pooling process) to the feature map in the CNN. The pooling map represents a down-sampled version of an original feature map, where the spatial dimensions (height and width) are reduced. For example, in the maximum pooling process, a pooling map is generated by dividing the feature map into non-overlapping regions (e.g., 2×2 grids or 3×3 grids) and retaining the maximum value from each non-overlapping region, while in the average pooling process, an average value of each region is taken.

Further, after processing performed by the convolutional layers 704 and the pooling layers, depicted as the combinatorial layers 706, an output of the last pooling layer is passed through each fully connected layer. The fully connected layers combine, and process features extracted by earlier layers (i.e., the convolution layers 704 and the combinatorial layers 706) to generate a final output, such as a class label for the object in the input image, e.g., 'person', 'cat', or 'dog'. Further, the generated final output is provided to the output layer 708 to render the final output to the user. In some embodiments, each fully connected layer may be the output layer 708.

Figure 8:
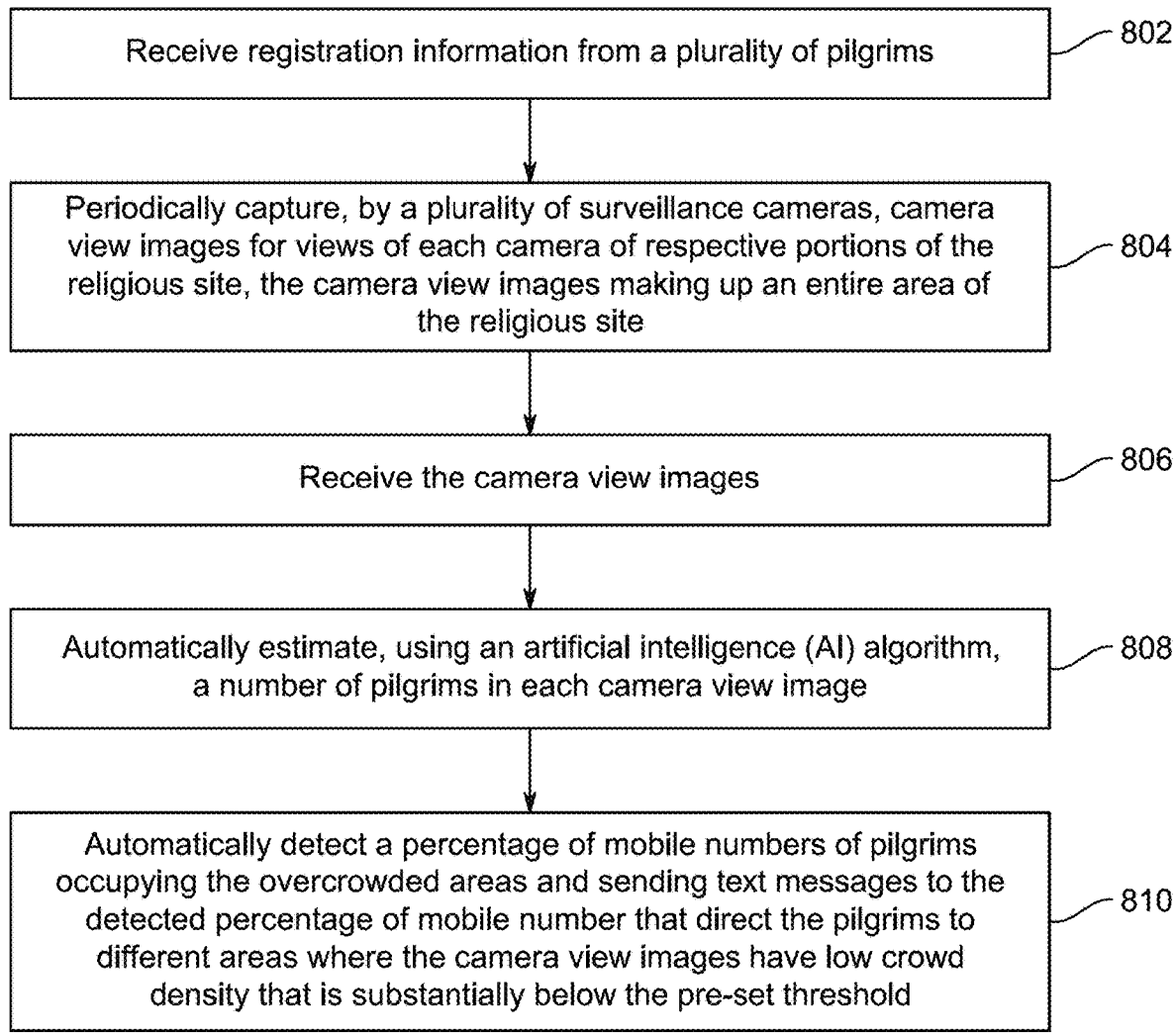
FIG. 8 is an exemplary diagram of a method of performing crowd management in a religious site, according to certain embodiments.

Referring now to FIG. 8, the present disclosure provides an exemplary diagram 800 of a method of performing crowd management in a religious site, according to certain embodiments. The religious site is the location that holds spiritual, historical, or cultural significance to a particular religious group. The religious site is often a place of worship, pilgrimage, or meditation, where people gather to perform rituals, prayers, or seek spiritual fulfillment. The religious site may include a temple, a church, a mosque, a shrine, and a synagogue. In order to manage the crowd at the religious site, initially, at step 802, registration information may be received from the pilgrims. The registration information may include mobile numbers of each pilgrim associated with the religious site for receiving text messages. The mobile numbers of each of the pilgrims may be received in order to allow for receiving text messages by the pilgrims. Apart from the mobile numbers, the registration information associated with each of the pilgrims may include the name, the age, the gender, the arrival and departure information, and the like. In an embodiment, the registration information may be captured from the pilgrims prior to the date of the religious event (e.g., the hajj event, the easter event, etc.) at the religious site by enabling each of the pilgrims to register themselves in advance for attending the religious event. For example, each pilgrim may register themselves via the online portal associated with the religious site or during the check-in process at the religious site.

Upon receiving the registration information and the mobile numbers, at step 804, camera view images for views of each camera of respective portions of the religious site may be periodically captured by the surveillance cameras. The camera view images make up the entire area of the religious site. In other words, each of the surveillance cameras is installed in the religious site in such a way that one or more of the surveillance cameras is configured to capture one or more portions of the entire area of the religious site. Examples of the plurality of surveillance cameras may include, the CCTV cameras, the IR cameras, the 360-degree cameras, the wireless cameras, the thermal cameras, the bullet cameras, the dome cameras, and the like. Further, at step 806, the camera view images may be received from each of the surveillance cameras. In particular, each of the surveillance cameras may be configured to periodically capture and transfer the camera view images to the computing device 106 over the network 104.

Upon receiving the camera view images, at step 808, the number of pilgrims in each camera view image may be automatically estimated. In an embodiment, the number of pilgrims in each camera view image may be estimated using the AI algorithm. In particular, with reference to FIG. 1, the AI model 112 may implement the AI algorithm configured for estimating the number of pilgrims in each camera view image. The AI model 112 may be pre-trained based on the training dataset to predict a number of people (same as the number of pilgrims) in each training image provided as an input to the AI model 112. In an embodiment, in order to estimate the number of pilgrims in each camera view image, the AI algorithm may include the CSRNet. The CSRNet includes the CNN as the front-end for the 2D feature extraction and the dilated CNN for the back-end. Further, to estimate the number of pilgrims in each camera view image, a total number of pilgrims in each camera view image is calculated. In an embodiment, while calculating the total number of pilgrims, the AI algorithm considers only objects with the confidence value greater than 0.5 as being a pilgrim. In particular, each pilgrim detected with the confidence value greater that 0.5 is marked with the bounding box using the YOLO network, i.e., the AI algorithm.

In other words, the AI algorithm, i.e., the YOLO network is configured to mark each pilgrim of a detected percentage mobile number in the camera view image with the bounding box. Further, based on the number of pilgrims estimated in each camera view image, the crowd density map is generated for each camera view image. In an embodiment, the crowd density map is a representation of the number of pilgrims in a camera view image. In other words, the crowd density map is a visual representation that estimates the distribution of people (i.e., each pilgrim) within a given area represented in each camera view image. Each pixel in the camera view image corresponds to a density of people in that area. The values in the crowd density map reflect the number of people in the given area, allowing for accurate crowd counting and density analysis in crowded scenes associated with the religious site. Once the crowd density map is generated for each camera view image, the Gaussian filter is applied to the crowd density map generated for each camera view image to remove sparks caused by point annotations in the crowd density map. The Gaussian filter has a fixed value. In an embodiment, the Gaussian filter is applied to remove noise and smooth the crowd density map, making the crowd density more accurate and clearer for further analysis. Further, the adaptive filter is applied to each neighbourhood pilgrim of the number of pilgrims in the crowd density map. In an embodiment, the adaptive filter is used to refine the crowd density map by adjusting the smoothing behavior of the crowd density map based on local variations in crowd density. The adaptive filter ensures that areas with high crowd density are accurately preserved while areas with lower crowd density are appropriately smoothed, enhancing an overall accuracy and details of the crowd density estimation. Examples of the adaptive filter may include a Wiener filter, a Least Mean Square (LMS) filter, a Kalman filter, a Median filter, and the like.

Further, based on processing performed at step 808, at step 810, a percentage of mobile numbers of pilgrims occupying overcrowded areas are automatically detected. The numbers of pilgrims occupying the overcrowded areas are automatically detected when the number of pilgrims in one of the camera view images has the variance of the crowd density that exceeds a pre-set threshold (e.g., 50%) to indicate respective overcrowded areas. In other words, once the number of pilgrims in each camera view image is estimated, the crowd density is determined in each portion represented via a corresponding camera view image of the camera view images. Upon determining the crowd density in each camera view image, a check is performed to identify one or more overcrowded areas corresponding to each camera view image. The one or more overcrowded areas are identified upon determining the variance of the crowd density in one or more camera view images of the camera view images to be above the pre-set threshold (e.g., 50%).

For example, suppose the variance in the crowd density in a camera view image associated with a portion (e.g., an area associated with an entrance gate) of the religious site received from a surveillance camera is determined to be 50%. In this case, since the variance in the crowd density at the entrance gate is determined to be 50% which is at or above the pre-set threshold (i.e., 50%). In this case, the area of the entrance gate may be indicated as the overcrowded area. Once the overcrowded area is detected, the mobile number of the pilgrims present in the overcrowded area may be retrieved based on the registration information. Once the mobile numbers are retrieved, text messages may be sent to aa percentage of randomly selected mobile numbers of pilgrims. The text message may include information (zone B is less crowded, please move to zone B) to direct the pilgrims to different areas where the camera view images have low crowd density that is substantially below the pre-set threshold. For example, the pilgrims may be directed to an area with the crowd density of 20% indicative of the low crowd density that is below the pre-set threshold (i.e., 50%). In some embodiments, the text message sent to the percentage of the mobile numbers of the pilgrims includes directions on how to go to the areas having the low crowd density.

In an embodiment, after a specific pre-set period of time (e.g., 1 hour), the automatic estimation of the number of pilgrims is performed again in each camera view image received periodically. Further, based on the automatic estimation performed, when overcrowded areas still exist in the one or more camera view images, random selection of pilgrims in each of the one or more camera view images is performed again. Further, based on the random selection of the pilgrims, the text message is sent to the mobile numbers of the randomly selected pilgrims to direct pilgrims to the areas having low crowd density. In an embodiment, the automatic estimation of pilgrims for a previous group in an overcrowded area is excluded when substantially few of the pilgrims in the previous group did not move even provided with the text message.

In an embodiment, the disclosure presents a system (e.g., the system 100) designed to improve the distribution of people in the religious site during religious events, promoting more even crowd distribution across the religious site. By utilizing existing surveillance cameras (i.e., the surveillance cameras) and networks (e.g., the network 104), the system estimates the number of people (also referred to as the number of pilgrims) in each portion of the religious site. When areas with the high crowd density are detected, the system sends notifications, i.e., the text message to a selected percentage of pilgrims in those overcrowded areas, guiding them to less crowded areas, i.e., the areas with the low crowd density. This process of estimating the number of pilgrims in each portion is repeated periodically, directing different groups of people until the crowd density imbalance in a specific portion falls below the pre-set threshold, ensuring safer and more efficient crowd management. Further, to accurately count the number of people in each camera view, the system leverages the CSRNet for crowd density estimation and the YOLO network for object detection (i.e., the detection of each individual) in each camera view image. As will be appreciated, management of the crowd using the disclosed method, and the system is not restricted to the religious site only. The management of the crowd using the disclosed method and the system may be performed for various other sites, e.g., the stadiums, the marketplaces, the concert venues, the exhibition and conference halls, and the like.

Figure 9:
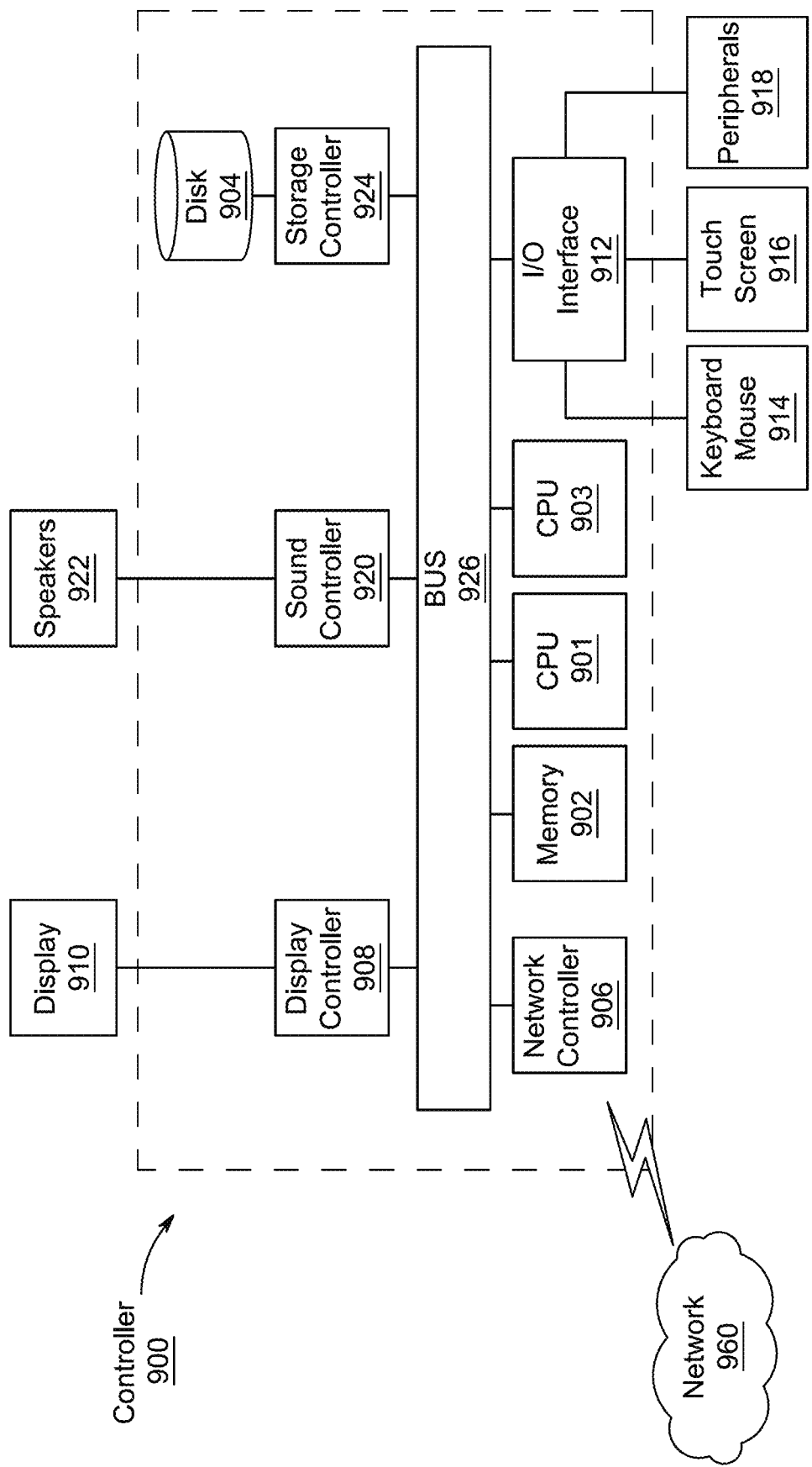
FIG. 9 is an illustration of a non-limiting example of details of computing hardware used in the computing device, according to certain embodiments.

Next, further details of the hardware description of the computing environment according to exemplary embodiments is described with reference to FIG. 9. In FIG. 9, a controller 900 that is described is representative of the system 100 of FIG. 1 in which the controller 900 is a computing device 106 which includes a CPU 901 which performs the processes described above/below. The process data and instructions may be stored in a memory 902 (same as the memory 110). These processes and instructions may also be stored on a storage medium disk 904 such as a Hard Disk Drive (HDD) or a portable storage medium or may be stored remotely.

Further, the present disclosure is not limited by the form of the computer-readable media on which the instructions of the inventive process are stored. For example, the instructions may be stored on Compact Disks (CDs), a Digital Versatile Discs (DVDs), in a Flash memory, a RAM, a ROM, a Programmable Read-Only Memory (PROM), an EPROM, an Electrically Erasable Programmable Read-Only Memory (EEPROM), a hard disk or any other information processing device with which the computing device communicates, such as a server or a computer.

Further, the present disclosure may be provided as a utility application, background daemon, or component of an operating system, or combination thereof, executing in conjunction with the CPU 901, 903 and an operating system such as a Microsoft Windows 7, a Microsoft Windows 10, a UNIX, a Solaris, a LINUX, an Apple MAC-OS and other systems known to those skilled in the art.

The hardware elements in order to achieve the computing device may be realized by various circuitry elements, known to those skilled in the art. For example, the CPU 901 or CPU 903 may be a Xenon or a Core processor from Intel of America or an Opteron processor from Advanced Micro Devices (AMD) of America, or may be other processor types that would be recognized by one of ordinary skill in the art. Alternatively, the CPU 901, 903 may be implemented on a Field-Programmable Gate Array (FPGA), an Application-Specific Integrated Circuit (ASIC), a Programmable Logic Device (PLD) or using discrete logic circuits, as one of ordinary skill in the art would recognize. Further, the CPU 901, 903 may be implemented as multiple processors cooperatively working in parallel to perform the instructions of the inventive processes described above.

The computing device in FIG. 9 also includes a network controller 906, such as an Intel Ethernet Professional (PRO) network interface card from an Intel Corporation of America, for interfacing with a network 960. As can be appreciated, the network 960 can be a public network, such as the Internet, or a private network such as a LAN or a WAN, or any combination thereof and can also include a PSTN or an Integrated Services Digital Network (ISDN) sub-networks. The network 960 can also be wired, such as an Ethernet network, or can be wireless such as a cellular network including EDGE, Third Generation (3G) and Fourth Generation (4G) wireless cellular systems. The wireless network can also be a WiFi, a Bluetooth, or any other wireless form of communication that is known.

The computing device further includes a display controller 908, such as a NVIDIA GeForce Giga Texel Shader eXtreme (GTX) or a Quadro graphics adaptor from a NVIDIA Corporation of America for interfacing with a display 910, such as a Hewlett Packard HPL2445w Liquid Crystal Display (LCD) monitor. A general purpose I/O interface 912 interfaces with a keyboard and/or mouse 914 as well as a touch screen panel 916 on or separate from display 910. The general purpose I/O interface 912 also connects to a variety of peripherals 918 including printers and scanners, such as an OfficeJet or DeskJet from HP.

A sound controller 920 is also provided in the computing device such as a Sound Blaster X-Fi Titanium from Creative, to interface with speakers/microphone 922 thereby providing sounds and/or music.

A general purpose storage controller 924 connects the storage medium disk 904 with a communication bus 926, which may be an Industry Standard Architecture (ISA), an Extended Industry Standard Architecture (EISA), a Video Electronics Standards Association (VESA), a Peripheral Component Interconnect (PCI), or similar, for interconnecting all of the components of the computing device. A description of the general features and functionality of the display 910, keyboard and/or mouse 914, as well as the display controller 908, the general purpose storage controller 924, the network controller 906, the sound controller 920, and the general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
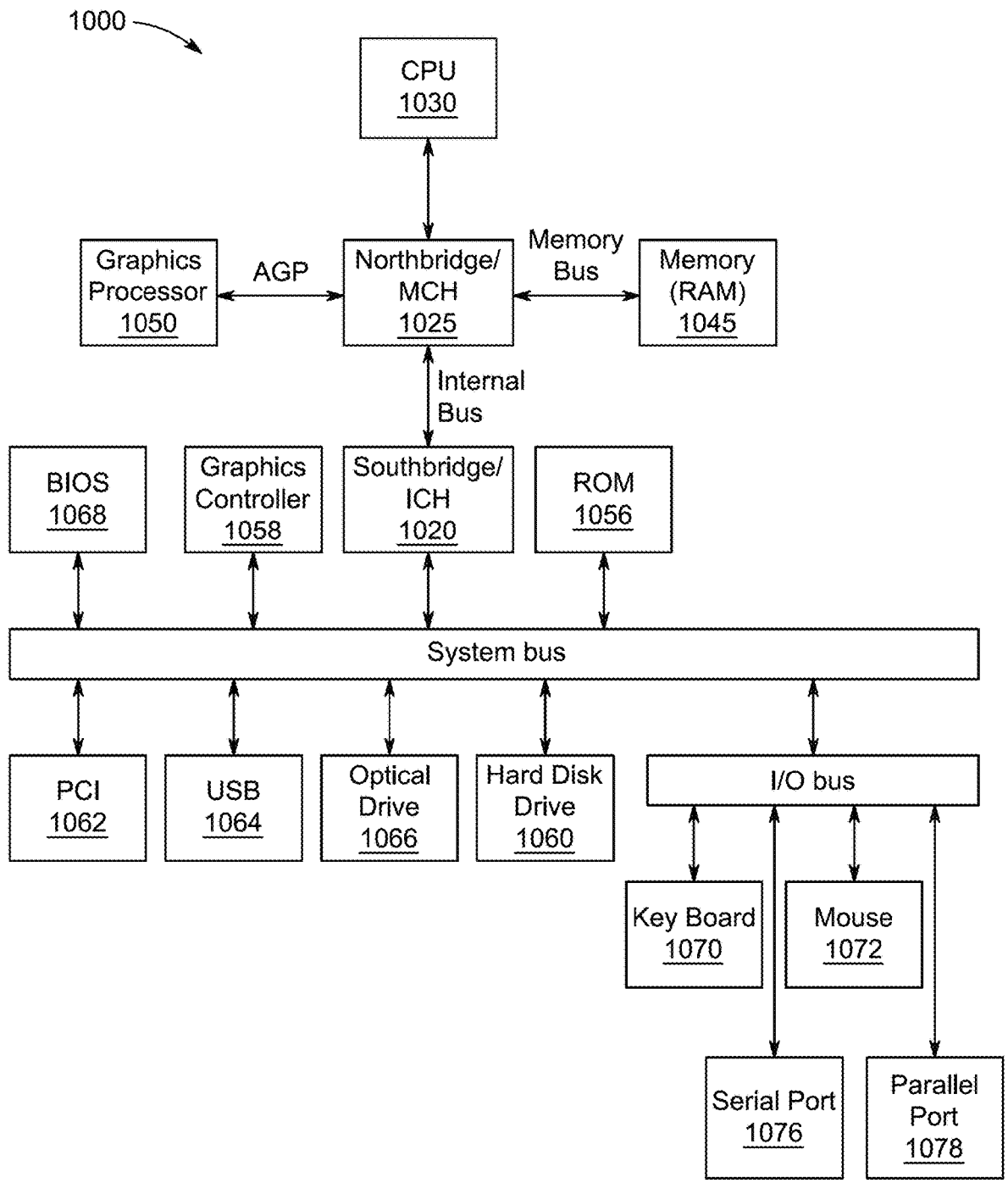
FIG. 10 is an exemplary schematic diagram of a data processing system used within the computing device, according to certain embodiments.

FIG. 10 shows a schematic diagram of a data processing system 1000, according to certain embodiments, for performing the functions of the exemplary embodiments. The data processing system 1000 is an example of a computer in which code or instructions implementing the processes of the illustrative embodiments may be located.

In FIG. 10, the data processing system 1000 employs a hub architecture including a North Bridge and a Memory Controller Hub (NB/MCH) 1025 and a south bridge and an I/O Controller Hub (SB/ICH) 1020. The CPU 1030 is connected to the NB/MCH 1025. The NB/MCH 1025 also connects to a memory 1045 via a memory bus and connects to a graphics processor 1050 via an Accelerated Graphics Port (AGP). The NB/MCH 1025 also connects to the SB/ICH 1020 via an internal bus (e.g., a unified media interface or a direct media interface). The CPU 1030 may contain one or more processors and even may be implemented using one or more heterogeneous processor systems.

Figure 11:
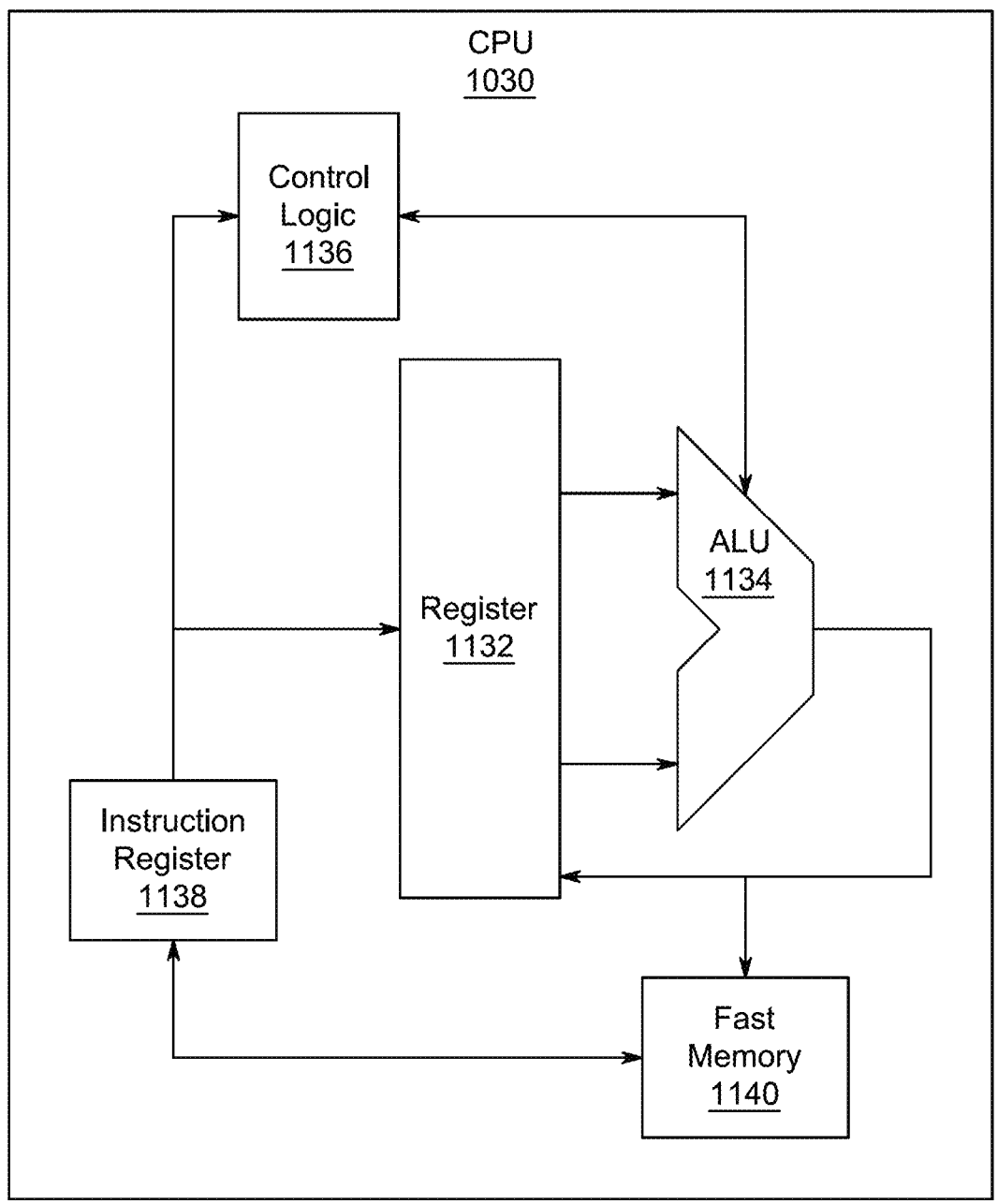
FIG. 11 is an exemplary schematic diagram of a processor used with the computing device, according to certain embodiments.

For example, FIG. 11 shows one implementation of the CPU 1030. In one implementation, an instruction register 1138 retrieves instructions from a fast memory 1140. At least part of these instructions is fetched from the instruction register 1138 by a control logic 1136 and interpreted according to the instruction set architecture of the CPU 1030. Part of the instructions can also be directed to a register 1132. In one implementation, the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using an Arithmetic Logic Unit (ALU) 1134 that loads values from the register 932 and performs logical and mathematical operations on the loaded values according to the instructions. The results from these operations can be feedback into the register 1132 and/or stored in the fast memory 1140. According to certain implementations, the instruction set architecture of the CPU 1030 can use a reduced instruction set architecture, a complex instruction set architecture, a vector processor architecture, a very large instruction word architecture. Furthermore, the CPU 1030 can be based on a Von Neuman model or a Harvard model. The CPU 1030 can be a digital signal processor, an FPGA, an ASIC, a Programmable Logic Array (PLA), a PLD, or a Complex Programmable Logic Device (CPLD). Further, the CPU 1030 can be an x86 processor by the Intel or by the AMD; an Advanced Reduced Instruction Set Computing (RISC) Machine (ARM) processor, a power architecture processor by, e.g., an International Business Machines Corporation (IBM); a Scalable Processor Architecture (SPARC) processor by Sun Microsystems or by Oracle; or other known CPU architecture.

Referring again to FIG. 10, the data processing system 1000 can include that the SB/ICH 1020 is coupled through a system bus to an I/O Bus, a ROM 1056, a Universal Serial Bus (USB) port 1064, a flash Binary Input/Output System (BIOS) 1068, and a graphics controller 1058. PCI/PCIe devices can also be coupled to SB/ICH 888 through a PCI bus 1062.

The PCI devices may include, for example, Ethernet adapters, add-in cards, and Personal Computer (PC) cards for notebook computers. The HDD 1060 and an optical drive 1066 (e.g., CD-ROM) can use, for example, an Integrated Drive Electronics (IDE) or a Serial Advanced Technology Attachment (SATA) interface. In one implementation, an I/O bus can include a super I/O (SIO) device.

Further, the HDD 1060 and the optical drive 1066 can also be coupled to the SB/ICH 1020 through a system bus. In one implementation, a keyboard 1070, a mouse 1072, a serial port 1076, and a parallel port 1078 can be connected to the system bus through the I/O bus. Other peripherals and devices that can be connected to the SB/ICH 1020 using a mass storage controller such as the SATA or a Parallel Advanced Technology Attachment (PATA), an Ethernet port, an ISA bus, a Low Pin Count (LPC) bridge, a System Management (SM) bus, a Direct Memory Access (DMA) controller, and an Audio Compressor/Decompressor (Codec).

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
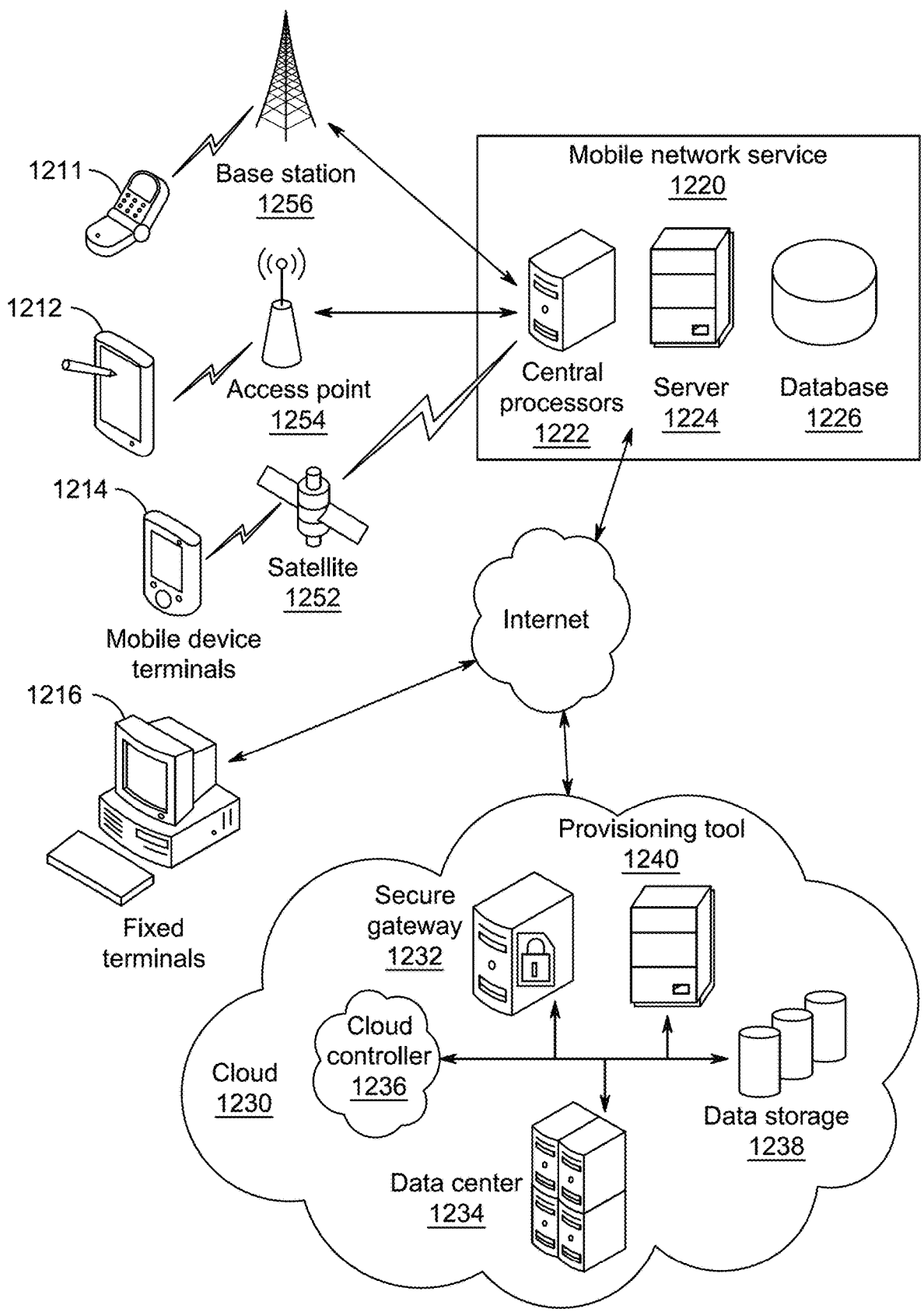
FIG. 12 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., display monitors, smart phones, tablets, personal digital assistants (PDAs)). More specifically, FIG. 12 illustrates client devices including a smart phone 1211, a tablet 1212, a mobile device terminal 1214 and fixed terminals 1216. These client devices may be commutatively coupled with a mobile network service 1220 via a base station 1256, an access point 1254, a satellite 1252 or via an internet connection. The mobile network service 1220 may comprise central processors 1222, a server 1224 and a database 1226. The fixed terminals 1216 and the mobile network service 1220 may be commutatively coupled via an internet connection to functions in cloud 1230 that may comprise a security gateway 1232, a data center 1234, a cloud controller 1236, a data storage 1238 and a provisioning tool 1240. The network may be a private network, such as the LAN or the WAN, or may be the public network, such as the Internet. Input to the system may be received via direct user input and received remotely either in real-time or as a batch process. Additionally, some implementations may be performed on modules or hardware not identical to those described. Accordingly, other implementations are within the scope that may be disclosed.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A method for crowd management in a religious site, comprising:
   receiving, by a processing circuitry, registration information from a plurality of pilgrims, including mobile numbers for receiving text messages;
   periodically capturing, by a plurality of surveillance cameras, camera view images for views of each camera of respective portions of the religious site, wherein the camera view images making up an entire area of the religious site:
   receiving, by the processing circuitry, the camera view images:
   automatically estimating, using an Artificial Intelligence (AI) algorithm performed by the processing circuitry, a number of pilgrims in each camera view image;
   when the estimated number of pilgrims has a variance of crowd density in one of the camera view images that exceeds a pre-set threshold to indicate respective overcrowded areas, automatically detecting, by the processing circuitry, a percentage of mobile numbers of pilgrims occupying the overcrowded areas and sending text messages to the detected percentage of mobile numbers that direct the pilgrims to different areas where the camera view images have low crowd density that is substantially below the pre-set threshold; and
   marking by the AI algorithm, each pilgrim of the detected percentage of mobile numbers in a camera view image by a bounding box using a convolutional neural network,
   wherein the step of automatic estimation by the AI algorithm includes estimating the number of pilgrims in each camera view image by a Congested Scene Recognition Network (CSRNet) which includes a Convolutional Neural Network (CNN) as a front-end for two-dimensional (2D) feature extraction and a dilated CNN for a back-end.

2. The method of claim 1, wherein the step of automatically estimating, includes generating a crowd density map, wherein the crowd density map is a representation of the number of pilgrims in a camera view image.

3. The method of claim 1, wherein the step of automatically detecting the percentage of mobile numbers includes sending, by the processing circuitry, a text message to the percentage of mobile numbers of pilgrims that includes directions on how to go to the different areas having low crowd density.

4. The method of claim 1, wherein after a specific pre-set period of time, the automatic estimation is performed again, and when overcrowded areas still exist, repeating randomly selecting and sending text messages to direct pilgrims to areas having low crowd density.

5. The method of claim 1, further comprising excluding the automatic estimation for a previous group in an overcrowded area when substantially few of the pilgrims in the previous group did not move even provided with a text message.

6. A system for crowd management in a religious site, comprising:
a plurality of surveillance cameras located throughout the religious site for periodically capturing camera view images for views of each camera of respective portions of the religious site, wherein the camera view images making up an entire area of the religious site:
a processing circuitry configured to:
receive registration information from a plurality of pilgrims, including mobile numbers for receiving text messages:
receive the camera view images:
automatically estimate, using an Artificial Intelligence (AI) algorithm, a number of pilgrims in each camera view image; and
when the estimated number of pilgrims has a variance of crowd density in one of the camera view images that exceeds a pre-set threshold to indicate respective overcrowded areas, automatically detect a percentage of mobile numbers of pilgrims occupying the overcrowded areas and send text messages to the detected percentage of mobile numbers that direct the pilgrims to different areas where the camera view images have low crowd density that is substantially below the pre-set threshold,
wherein the processing circuitry is further configured to estimate the number of pilgrims in each camera view image by a Congested Scene Recognition Network (CSRNet) which includes a Convolutional Neural Network (CNN) as a front-end for two-dimensional (2D) feature extraction and a dilated CNN for a back-end, and
wherein the processing circuitry is further configured to mark by the AI algorithm, each pilgrim of the detected percentage of mobile numbers in a camera view image by a bounding box using a convolutional neural network.

7. The system of claim 6, wherein the processing circuitry is further configured to generate a crowd density map, wherein the crowd density map is a representation of the number of pilgrims in a camera view image.

8. The system of claim 6, the processing circuitry is further configured to send a text message to the detected percentage of mobile numbers of pilgrims that includes directions on how to go to the different areas having low crowd density.

9. The system of claim 6, wherein the processing circuitry is further configured to after a specific pre-set period of time, perform the automatic estimation again, and when overcrowded areas still exist, repeat randomly selecting and send text messages to direct pilgrims to areas having low crowd density.

10. The system of claim 6, wherein the processing circuitry is further configured to exclude the automatic estimation for a previous group in an overcrowded area when substantially few of the pilgrims in the previous group did not move even provided with a text message.

* * * * *